July 15, 1941.  D. A. BATTISTE  2,249,307
DOUGH PROCESSING APPARATUS
Filed Sept. 5, 1940  3 Sheets—Sheet 1
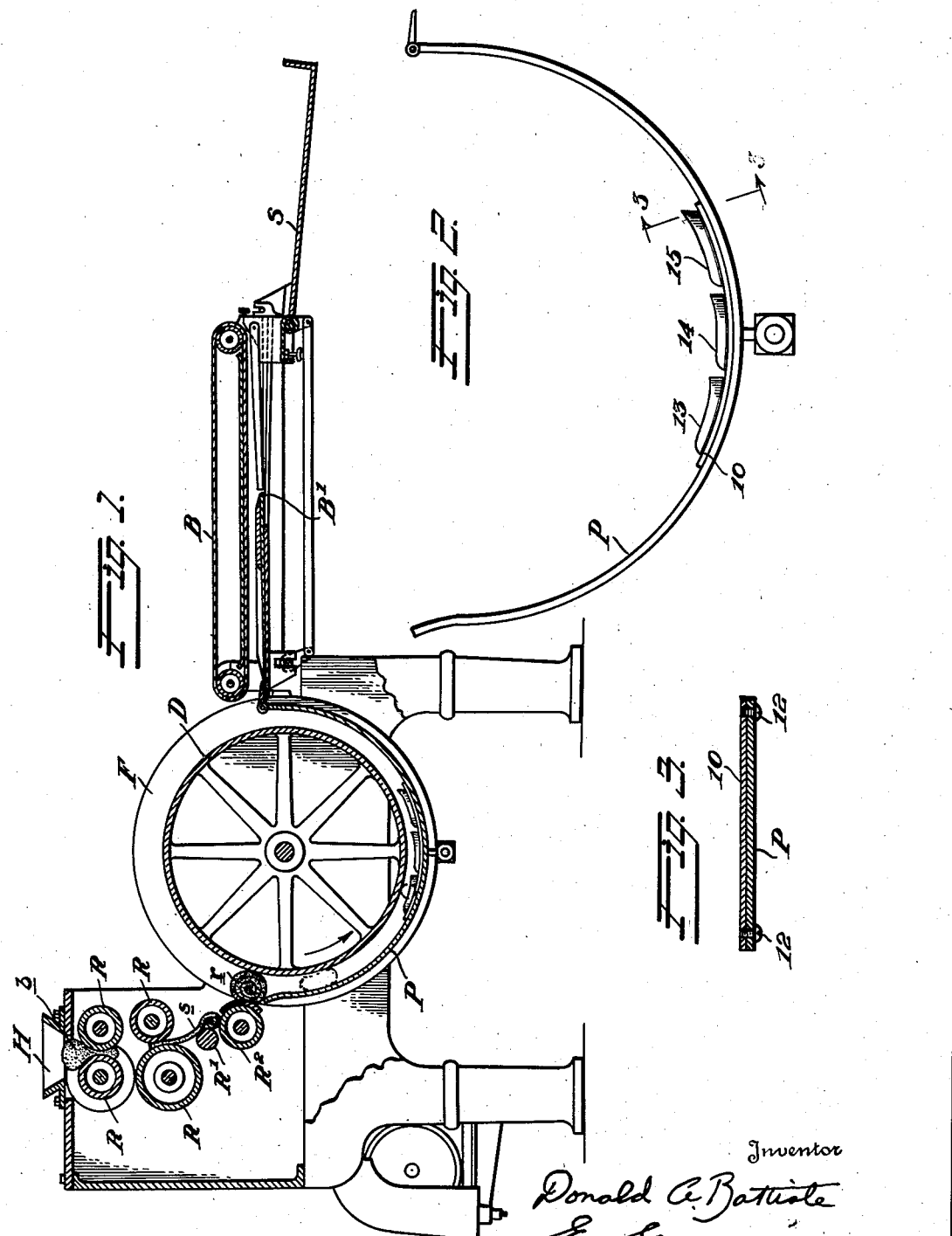

July 15, 1941.    D. A. BATTISTE    2,249,307
DOUGH PROCESSING APPARATUS
Filed Sept. 5, 1940    3 Sheets-Sheet 2
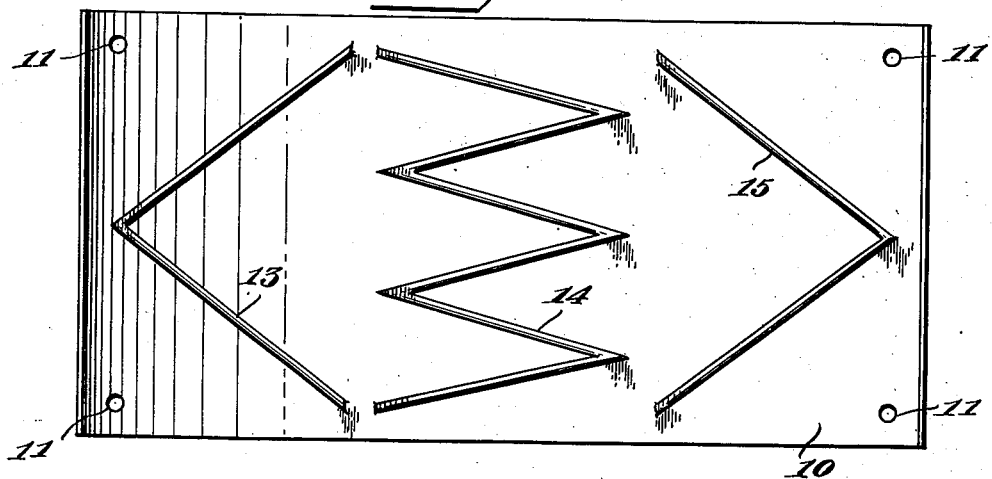
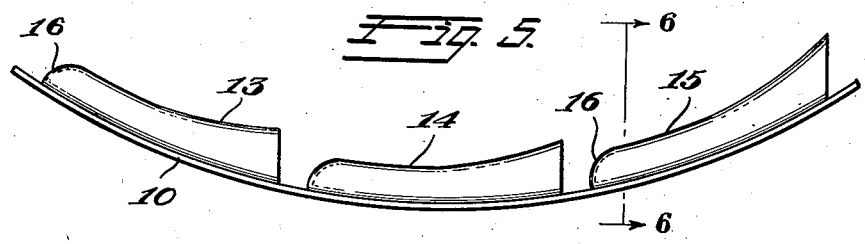
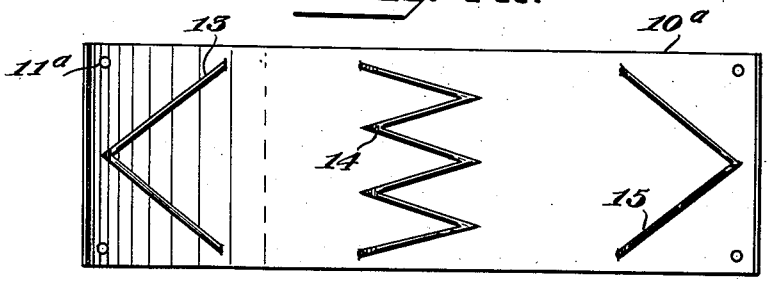
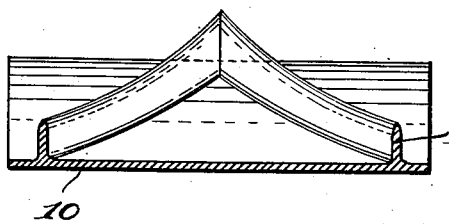

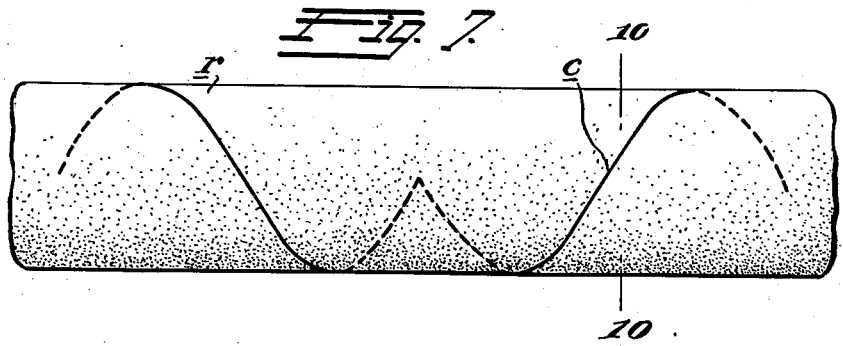
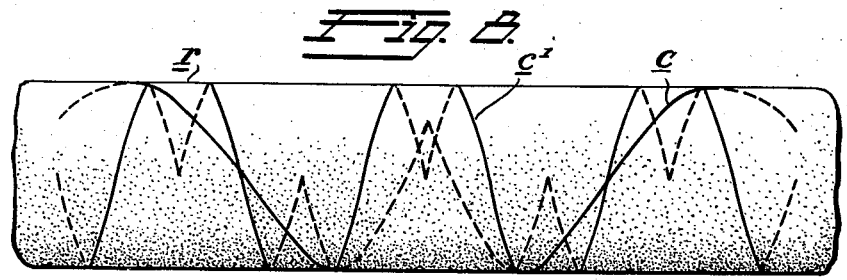
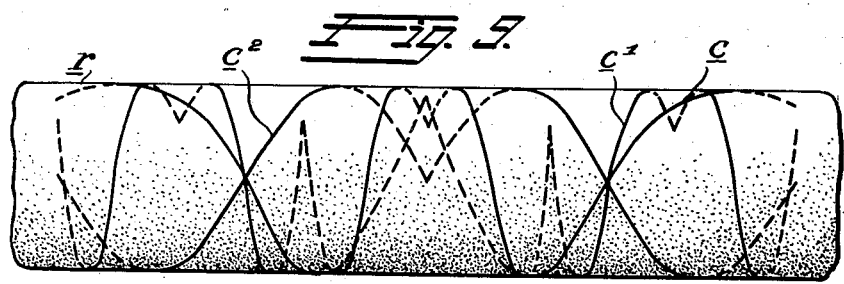
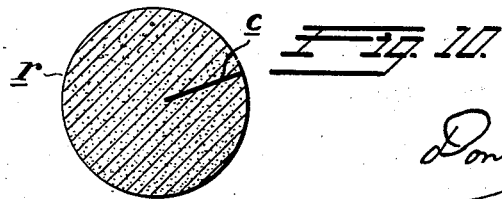

Patented July 15, 1941

2,249,307

UNITED STATES PATENT OFFICE 2,249,307

DOUGH PROCESSING APPARATUS

Donald A. Battisté, Philadelphia, Pa.

Application September 5, 1940, Serial No. 355,536

12 Claims. (Cl. 107—9)

My invention relates to means for processing dough. More specifically, the invention is concerned with a means for working or processing dough in the manufacture of bread or other similar dough product.

In the present-day machine production of bread, the principal method employed is to pass the dough through a scaler or divider which weighs it out in pieces of accurate and uniform weight for full sized loaves of bread and discharges the pieces onto a suitable conveyor. The conveyor discharges the pieces successively into a rounder wherein each piece is rolled into substantially spherical shape. Each piece of dough is discharged from the rounder into an overhead proofer, which carries it to a molder, the dough curing and rising to some extent as it passes through the proofer. Finally the pieces pass successively into the molder, wherein each piece first is rolled into a sheet through successive sets of rolls and the resultant sheet is then passed between reversely driven rolls which roll the sheet into a substantially cylindrical loaf. Each cylindrical loaf is then passed between a rotary drum and a cooperating compression plate which compresses the cylindrical loaf of dough so as to unite the convolutions together effectively and uniformly and thereby provide a substantially homogenous mass. The loaf thus formed may be panned in preparation for baking or may proceed through additional steps prior to the panning as e. g. through an extender for further working of the dough and extension of the loaf.

In the baking art, porosity and lightness is imparted to the loaf by the formation of pockets or cells from gas released as a result of the bacterial action of yeast. While the presence of the gas pockets is necessary and desirable, it is also necessary and desirable that they be restricted in size and uniformly distributed as a bread of superior texture and flavor is obtained when these gas pockets are extremely small in size, numerous and evenly spaced throughout the mass of the loaf.

Among the many attempts to avoid these large gas pockets in loaves of bread is the proposed method of piercing the raised dough immediately prior to baking throughout substantially the entire horizontal area and depth of the loaf by means of a series of needles for permitting escape of entrained gas to the atmosphere.

This method, however, entails the provision of additional equipment as well as a separate manual operation whereby considerably more time will be required in the production of bread which is of course a major consideration in a quantity production operation of this kind and leaves the skin ruptured.

Furthermore, this method presents a serious objection in that the skin of the completely rolled dough is pierced or ruptured and will not completely seal during the baking operation, thereby presenting an irregular crust on the baked product.

It has further been proposed to divide the dough loaf transversely of the longitudinal axis thereof into several sections and arrange such sections in a baking pan in such positions that the portions of the original loaf are parallel to each other, in other words, transverse to the position they would normally occupy were the whole loaf placed in the pan as a unit.

While in this proposed method the loaves may be automatically cut in order to divide it into the desired number of sections during the molding operation, an additional operation is required in properly panning these loaf sections. Furthermore, by this method the entire mass of the original loaves is not cut so as to assure puncture of all large air cells, and consequently such method fails to satisfactorily overcome the objection above referred to.

A further step toward solution of this problem has been the method of producing pan bread in the form of an elongated loaf consisting in forming a plurality of slender rolls of dough twisted around each other whereby the large gas pockets or cells were avoided by substantial elongation of the cells which became correspondingly smaller in transverse section.

While in accordance with this method, a bread devoid of the large cells or pockets may be provided, nevertheless an additional operation is required when the twisting is done by hand as has usually been the case, and when done by machinery, complicated and expensive equipment is required.

Furthermore, while the otherwise large gas cells are reduced by substantial elongation thereof, according to this method, the cells are not uniform throughout the mass of dough which is a highly important consideration in the production of bread or like product in order that the bread will be uniformly baked throughout its mass which has been found necessary to provide a tender crum and which can be readily masticated without the sensation of doughiness in the mouth as has been experienced with twisted bread.

A primary object of this invention is the provision of means for effectively eliminating the heretofore objectionable large gas cells in loaves of bread without entailing any additional operations to those above enumerated in the present day machine production of bread.

A further object of the invention is the provision of means for processing dough in the manufacture of bread wherein the dough rolls during the usual rolling process are provided with a circumferential cut or cuts for discharge of pocket entrapped gases from within the rolls for the production of bread with a uniform texture or consistency, and flavor.

A still further object of the invention is the provision of means for processing dough in the manufacture of bread during the usual rolling process in the formation of the loaves, wherein the rolls are provided with intersecting, angularly related, circumferential cuts for the escape of pocket entrained gas during the rolling process as well as during any succeeding operations as the extension of the rolls in the formation of loaves.

A still further object of the invention is the provision of simple means for attachment to the usual pressure plate of bread dough treating machines for carrying out the method above referred to.

With the above and other objects in view, reference will be had to the accompanying drawings wherein is disclosed a preferred means for carrying out the objects above enumerated.

In the drawings:

Fig. 1 is a view partly in side elevation and partly in longitudinal section of a typical bread dough working machine, showing the application of the improved means for carrying out the method according to the present invention.

Fig. 2 is an enlarged side elevation of the pressure plate with the improved dough cutting means applied thereto.

Fig. 3 is a transverse section in a plane substantially as indicated by the line 3—3 in Fig. 2.

Fig. 4 is a top plan view of the dough cutting attachment.

Fig. 4—A is a top plan view of a modified form of dough cutting attachment.

Fig. 5 is a side elevation of the structure of Fig. 4.

Fig. 6 is a transverse section on the line 6—6 of Fig. 5.

Fig. 7 is a side elevational view of a roll of dough showing the cut therein as formed by the first knife.

Fig. 8 is a similar view showing the cuts jointly formed by the first and second knives.

Fig. 9 is a similar view showing the cuts jointly formed by the first, second and third knives.

Fig. 10 is a transverse section on the line 10—10 in Fig. 7.

The improved cutting attachment illustrated in Figs. 4, 5 and 6 by which the improved method above referred to is carried into effect may be used with any standard bread dough working machine, an example of which is illustrated in Fig. 1 and which generally includes a hopper H through which a ball of dough b is fed from the usual overhead proofer and thence between cooperating rollers R for sheeting the dough as indicated as s, the sheet of dough progressing to rollers $R^1$, $R^2$ which form the sheet of dough into a roll $r$. The roll $r$ is received between a rotating drum D and a stationary pressure plate P concentric with and spaced from the drum, the dough being rolled between the drum and plate and progressively propelled throughout the arcuate length of the plate to the mouth of the extender. The drum D is provided with end flanges F to confine the roll $r$ between same and the plate P.

The extender generally comprises an endless feed belt B and an adjustable dough roll extending bed B', a feed out shelf S being provided at the discharge end of the extender.

The improved cutting means is adapted for detachable connection with the pressure plate P and in its preferred form includes an arcuate plate 10 in conformity with the curvature of the plate P and being provided with corner apertures 11 for receiving screws 12 for detachably connecting the plate 10 to the pressure plate P.

Integral with, or suitably secured to the plate 10 are a plurality of dough cutting knives 13, 14 and 15 which are adapted for successive engagement with the roll of dough in its passage over the pressure plate P.

The knives 13 and 15 are each of V-form in plan but with their apices oppositely directed. That is the apex of knife 13 first comes into engagement with the roll of dough and the apex of knife 15 last emerges from the roll of dough.

The intermediate knife 14 is in the form of a double W or a succession of reversely positioned V's.

In other words, the knives 13, 14 and 15 include a plurality of cutting blades which are straight in plan and which are variously positioned in angular relation to the longitudinal direction of plate 10 whereby they form in the roll of dough passing thereover, a plurality of intersecting cuts as represented in Figs. 7 to 10 and later referred to.

The knives 13, 14 and 15 are preferably of equal length longitudinally of plate 10 and preferably each of such length as to form a cut extending throughout the circumference of the dough roll and the knives are spaced apart at uniform distances to assure completion of the cutting operation of one prior to the beginning of the cutting operation by the successive ones.

The knives extend vertically of the plate 10 a distance to form relatively dep cuts in the dough rolls, or cuts which extend almost to the longitudinal axis of the rolls as indicated in Fig. 10.

The knife blades are preferably of uniform height from the front ends to substantially the longitudinal center thereof from which points they taper upwardly to the rear ends thereof and the front ends are preferably rounded as indicated at 16 to effect gradual penetration of the dough without tending to tear same.

The knives 13, 14 and 15 may of course be of other forms and relative dimensions than as disclosed so long as they embody anguarly related blades for effecting intersecting cuts in the rolls of dough in their passage over the pressure plate P.

The plate 10 is preferably secured to the pressure plate P substantially centrally thereof, as indicated in Fig. 2. However, it may be disposed to the right or left of the center as conditions of operation may best justify.

While it is preferred to provide the knives on a plate 10 for removable attachment to the pressure plate, the individual knives may be separately secured directly to the pressure plate. By the provision of the separate unit including the plate 10, however, knives of various dimensions may readily be installed or worn or broken knives readily replaced.

With the knives attached to the pressure plate

P the operation of the cooperating drum D and plate P in rolling the dough as in common practice is in no way affected, the knives simply being successively engaged by the dough rolls as they are progressed in their rolling movement between the drum and pressure plate for forming cuts in the dough rolls as indicated in Figs. 7 to 10.

A roll of dough $r$ upon movement over the first knife 13 will be provided with a cut $c$ as indicated in Fig. 7 which extends substantially completely all the way around the roll in a pair of spiral cuts meeting at an apex in the longitudinal center of the roll and terminating adjacent the opposite ends of the roll at points substantially longitudinally alined with the apex.

The roll thus cut moves over the second knife 14 whereby it is provided with a second cut $C^1$ which substantially completely encircles the roll in spiral form with certain runs thereof intersecting runs of the first cut $c$ as clearly indicated in Fig. 8.

The roll thus cut continues in its rolling movement over the third knife 15 whereby it is provided with a third cut $C^2$ of the form of the first cut $c$ and which has certain runs thereof in intersecting relation to the runs of the cuts $c$ and $c^1$ as indicated in Fig. 9.

It is to be noted that the rolls of dough are being continuously progressed over the pressure plate P in their usual rolling operation while the cuts $c$, $c^1$ and $c^2$ are being formed by the successive knives 13, 14 and 15 and that each roll of dough is rotated throughout somewhat more than a full circumference thereof from the point of engagement with each knife to point of engagement with the succeeding knife and that when the cuts $c$, $c^1$ and $c^2$ have all been formed in the roll, same has rotated through substantially more than three circumferences thereof.

The knives may of course be in end contact or the knives may be substantially spaced as in Fig. 4—A, wherein a plate 10a is provided having screw receiving apertures 11a and the knives 13, 14 and 15 which are spaced apart distances somewhat greater than the lengths of the knives.

The purpose of the cuts is to intersect objectionally large gas pockets or cells in the rolls of dough for venting same to the atmosphere and by the provision of the spiral cuts a somewhat bellows-like action of the walls of the cuts results during rolling movement of the rolls which results in expulsion of gases from any large gas cells intersected by the cuts as well as cells adjacent thereto.

It is to be particularly noted that by the provision of spiral cuts, the walls thereof will progressively open and close throughout the lengths of the cuts whereby danger of tearing the roll apart is avoided, if, for example, the cuts extended longitudinally and transversely of the roll.

By spacing the knives as in Fig. 4—A, a roll of dough will be rotated throughout more than a full circumference thereof between each two consecutive knives whereby gas will be relieved from pockets or cells intersected by one knife before coming into cutting engagement with a succeeding knife and when all three cuts $c$, $c^1$ and $c^2$ have been formed in the roll, it will continue in forward compressive rolling movement between the drum D and pressure plate P to the inlet end of the extender.

During such rolling movement of the rolls $r$ the walls of the various cuts will progressively open and close which will not only permit escape of gases from knife intersected pockets but due to the bellows-like action of such walls the gases will be forcibly expelled from the intersected and possibly adjacent gas pockets.

The cuts progressively expand and contract during movement of the rolls between the drum and pressure plate and are for the most part still active at the entrance of the extender.

Upon movement of the rolls through the extender, the cuts are gradually sealed or the walls thereof adhered whereby the skins of the rolls are substantially intact or unbroken upon arrival of the rolls at the exit end of the extender.

While I have disclosed three consecutively acting knives, my invention is not limited thereby, as satisfactory results may be obtained with two or more than three knives. Thus I may employ two knives 14 oppositely disposed or may employ several oppositely disposed knives such as those designated 13 and 15, it being essential only that intersecting spiral cuts be provided in the rolls in relatively closely spaced relation throughout the surface extents thereof for assurance of severance of any possible large gas cells within the rolls.

The provision of the intersecting cuts not only provide for the effective discharge of gas from large pockets intersected thereby but also provide for a further kneading action as effected by the several sections of the roll thereby substantially augmenting the expulsion of gases and providing a dough mass of uniform cell consistency throughout. By the provision of such roll of dough a uniform heat conductivity is presented throughout its mass whereby the roll will be baked uniformly throughout with a resulting loaf having definitely tender crum and crust and which may be more readily masticated without the sensation of doughiness in the mouth of the consumer.

It is to be particularly noted that the operation of the means above described is automatically carried out during the usual dough molding operation without the requirement of additional labor or time, and that by cutting the dough roll adjacent the last stage of the molding operation there can not be any large gas pockets subsequently formed and furthermore, the sealing of the cuts is assured prior to the subsequent baking process.

While I have disclosed my invention in accordance with a preferred embodiment thereof, such is to be considered as illustrative only, and not restrictive, the scope of the invention being defined in the subjoined claims.

What I claim and desire to secure by U. S. Letters Patent is:

1. A cutting attachment for a dough working machine including a rotatable drum and a concentric arcuate pressure plate in spaced relation thereto, comprising a plate for removable attachment to the pressure plate, and successive series of angularly related knives carried by the plate for extension approximately midway into the space between the rotatable drum and the pressure plaee.

2. The attachment according to claim 1 wherein the knives of each series thereof extend longitudinally of the plate a distance substantially equal to a circumference of which the depth of said space is a diameter.

3. A dough cutting attachment for a dough working machine, comprising an arcuate plate for removable connection with the pressure plate of the machine, and successive series of dough cutting knives on the plate, the series being spaced longitudinally of the plate and the knives of each series meeting in apices and converging and diverging relative to the longitudinal center line of the plate.

4. The structure according to claim 3 wherein each knife is of uniform depth from its front end throughout a portion of the length thereof and tapers from such portion upwardly from the plate to the rear end of said knife.

5. In a dough working machine including a rotatable drum member and a spaced concentric pressure plate member for rolling movement of a roll of dough therebetween; the improvement comprising means supported by one of said members for forming intersecting circumferential cuts in the dough roll during its aforesaid rolling movement between said members.

6. A cutting attachment for a dough working machine including an elongated pressure plate, comprising a rectangular plate for removable attachment to the pressure plate, and a series of knives carried by said rectangular plate and extending substantially throughout the width thereof and in angular relation to the opposite sides thereof, whereby a roll of dough is cut spirally while being rolled on said pressure plate.

7. In a dough working machine for bread making, spaced and relatively movable elongated members for rolling a mass of dough therebetween and simultaneously advancing same relative to one of said members, and a dough cutting knife projecting from one of said members and extending obliquely to the direction of said dough advancing movement, whereby a roll of dough is cut spirally while being rolled by said members for bread making.

8. In a dough working machine for bread making, spaced and relatively movable members for rolling a mass of dough therebetween, said members having elongated opposed dough rolling surfaces, and a knife extending obliquely across one of said surfaces for forming a spiral cut in the rolled mass of dough while being rolled between said elongated opposed surfaces.

9. In a dough working machine including relatively spaced and movable members for rolling a mass of dough therebetween, said members having elongated opposed dough rolling surfaces, a dough cutting knife of materially less length than said members projecting from and obliquely to the elongated surface of one of said members, whereby a roll of dough is cut spirally while being rolled.

10. A cutting attachment for a dough working machine having an elongated pressure plate, comprising a member extending substantially across the width of said plate at a point between the ends of said plate, and a knife carried by said member and extending obliquely to the longitudinal axis of said plate, whereby to form a spiral cut in a mass of dough while being rolled on said plate.

11. In a dough working machine, an elongated member of substantial width and means cooperating therewith for rolling a mass of dough in contact with and lengthwise of said elongated member, and spaced angularly disposed knives on the elongated member for forming intersecting cuts extending circumferentially of and substantially throughout the length of said roll of dough during the rolling thereof.

12. In a dough working machine for bread making, a rectangular plate for rolling contact from one end to the other thereof with an elongated mass of dough, and a knife projecting from the plate and including continuous blades arranged obliquely to the longitudinal axes of the plate for forming a circumferential spirally directed cut in the mass of dough substantially throughout the length thereof during rolling of the dough lengthwise of said plate.

DONALD A. BATTISTE.